United States Patent [19]

Spaulding

[11] Patent Number: 4,973,205

[45] Date of Patent: Nov. 27, 1990

[54] HAND DRILL APPARATUS

[76] Inventor: Silas Spaulding, 313 W. 5th St., Jasper, Ind. 47546

[21] Appl. No.: 451,632

[22] Filed: Dec. 18, 1989

[51] Int. Cl.[5] .............................................. B23B 45/00

[52] U.S. Cl. ........................................ 408/16; 33/334; 206/379; 279/1 K; 408/241 R

[58] Field of Search ..................... 408/16, 241 R, 716; 279/1 K; 33/334; 81/16; 206/379

[56] References Cited

U.S. PATENT DOCUMENTS

| | | | |
|---|---|---|---|
| 3,864,839 | 2/1975 | Wolf | 408/716 |
| 4,402,141 | 9/1983 | Sterrenberg . | |
| 4,432,146 | 2/1984 | Klein . | |
| 4,457,078 | 7/1984 | Suchy . | |
| 4,508,221 | 4/1985 | Olson | 408/241 R |
| 4,656,749 | 4/1987 | Ashley et al. . | |
| 4,785,544 | 11/1988 | Heinsius . | |
| 4,797,040 | 1/1989 | Hibbard | 408/241 R |

FOREIGN PATENT DOCUMENTS

| | | | |
|---|---|---|---|
| 2362550 | 6/1975 | Fed. Rep. of Germany | 408/16 |
| 3525352 | 1/1987 | Fed. Rep. of Germany | 408/16 |
| 2302164 | 9/1976 | France | 408/241 R |
| 599061 | 10/1959 | Italy | 33/334 |
| 56-313 | 5/1981 | Japan | 408/241 R |

*Primary Examiner*—Daniel W. Howell
*Attorney, Agent, or Firm*—Leon Gilden

[57] ABSTRACT

An apparatus is set forth wherein a hand drill includes a conventionally configured elongate housing with an elongate orthogonally extending handle relative thereto, with a forwardly mounted collet to receive drill bits therewithin. The apparatus further includes a transparent drill bit housing pivotally mounted to an upper surface of the central housing body of the drill formed with a snap-fit cover to receive drill bits in a convenient and accessible manner. A bifurcated chuck-key holder includes resilient legs defining a slot to resiliently secure a chuck-key therewithin. A series of spirit levels are further provided wherein the levels include a mercury encapsulate leveling member to accommodate vibration in use of the drill, wherein the levels are positioned within an extension housing of the drill bit housing to provide various visible orientations of the levels during use of the drill. Further, an illumination member in operative association with the trigger switch of the drill is mounted between the chuck-key holder and the associated chuck, wherein optionally the illumination member may be provided within a telescoping housing to provide enhanced illumination of workpieces.

4 Claims, 4 Drawing Sheets

HAND DRILL APPARATUS

BACKGROUND OF THE INVENTION

1. Field of the Invention

The field of invention relates to hand drill apparatus, and more particularly pertains to a new and improved hand drill apparatus wherein the same sets forth a synergistic combination of leveling members in association with a drill bit holder and associated chuck-key holder with illumination means to provide a complete, compact, and readily utilizable hand drill organization.

2. Description of the Prior Art

Hand drill apparatus is well known the in the prior art. Hand drills are utilized with a variety of accessories such as chuck-keys, illumination sources, accessory drills, and the like. The prior art has configured drill bits of the prior art to utilize, in a variety of manners, various portions of such accessory apparatus but has heretofore failed to provide a compact, synergistic organization, as set forth by the instant invention, to enable a convenient and accessible coordination of various components utilized in a drilling operation. Examples of the prior art includes U S. Pat. No. 4,457,078 to Suchy wherein a leveling attachment is securable in a retrofit manner to an existing drill housing comprising an encircling band to encompass the housing to mount the leveling device thereon.

U.S. Pat. No. 4,656,749 sets forth a hand drill level mounted in an overlying relationship spaced above a drill bit housing cooperative therewith and aligned with the longitudinal axis of the drill bit to assist in the drilling of horizontal holes within work surfaces.

U.S. Pat. No. 4,402,141 to Sterrenberg sets forth a leveling mechanism mounted to a forward surface of a drill bit positioned between an associated chuck and drill bit housing in a retrofit manner relative to a conventional drill bit. The leveling mechanism extends above and beyond the housing for use therewith.

U.S. Pat. No. 4,482,146 to Klein sets forth a drill leveling apparatus mounted in an overlying relationship relative to an associated drill bit housing in a manner consistent with the prior art.

U.S. Pat. No. 4,785,544 to Heinsius sets forth a spirit level accessory mounted to a drill bit that is positioned in an encompassing relationship relative to the chuck-key support housing.

As such, it may be appreciated that there is a continuing need for a new and improved hand drill apparatus wherein the same addresses the problems of flush mounting associated leveling mechanisms in association with the drill bit housing to provide an unobtrusive association therewith, as well as providing conventional accessory items utilized with a drill in a compact, synergistic association with a hand drill apparatus.

SUMMARY OF THE INVENTION

In view of the foregoing disadvantages inherent in the known types of hand drill apparatus now present in the prior art, the present invention provides a hand drill apparatus wherein the same utilizes mercury spirit level members cooperative and flush mounted within a drill bit housing in association with cooperating accessory members to provide a compact organization for use in a drilling procedure. As such, the general purpose of the present invention, which will be described subsequently in greater detail, is to provide a new and improved hand drill apparatus which has all the advantages of the prior art hand drill apparatus and none of the disadvantages.

To attain this, the present invention includes an apparatus wherein a hand drill includes a conventionally configured elongate housing with an elongate orthogonally extending handle relative thereto, with a forwardly mounted collet to receive drill bits therewithin. The apparatus further includes a transparent drill bit housing pivotally mounted to an upper surface of the central housing body of the drill formed with a snap-fit cover to receive drill bits in a convenient and accessible manner. A bifurcated chuck-key holder includes resilient legs defining a slot to resiliently secure a chuck-key therewithin. A series of spirit levels are further provided wherein the level includes a mercury encapsulated leveling member to accommodate vibration in use of the drill, wherein the levels are positioned within an extension housing of the drill bit housing to provide various visible orientations of the levels during use of the drill. Further, an illumination member in operative association with the trigger switch of the drill is mounted between the chuck-key holder and the associated chuck, wherein optionally the illumination member may be provided within a telescoping housing to provide illumination of the workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of &he present invention to provide a new and improved hand drill apparatus which has all the advantages of the prior art hand drill apparatus and none of the disadvantages.

It is another object of the present invention to provide a new and improved hand drill apparatus which may be easily and efficiently manufactured and marketed.

It is a further object of the present invention to provide a new and improved hand drill apparatus which is of a durable and reliable construction.

An even further object of the present invention is to provide a new and improved hand drill apparatus which is susceptible of a low cost of manufacture with regard to both materials and labor, and which accordingly is then susceptible of low prices of sale to the consuming public, thereby making such hand drill apparatus economically available to the buying public.

Still yet another object of the present invention is to provide a new and improved hand drill apparatus which provides in the apparatuses and methods of the prior art some of the advantages thereof, while simultaneously overcoming some of the disadvantages normally associated therewith.

Still another object of the present invention is to provide a new and improved hand drill apparatus wherein the same provides a synergistic cooperation of components utilized in a drilling procedure, such as leveling members, chuck-key holder, illumination means, and drill bit storage.

These together with other objects of the invention, along with the various features of novelty which characterize the invention, are pointed out with particularity in the claims annexed to and forming a part of this disclosure. For a better understanding of the invention, its operating advantages and &he specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
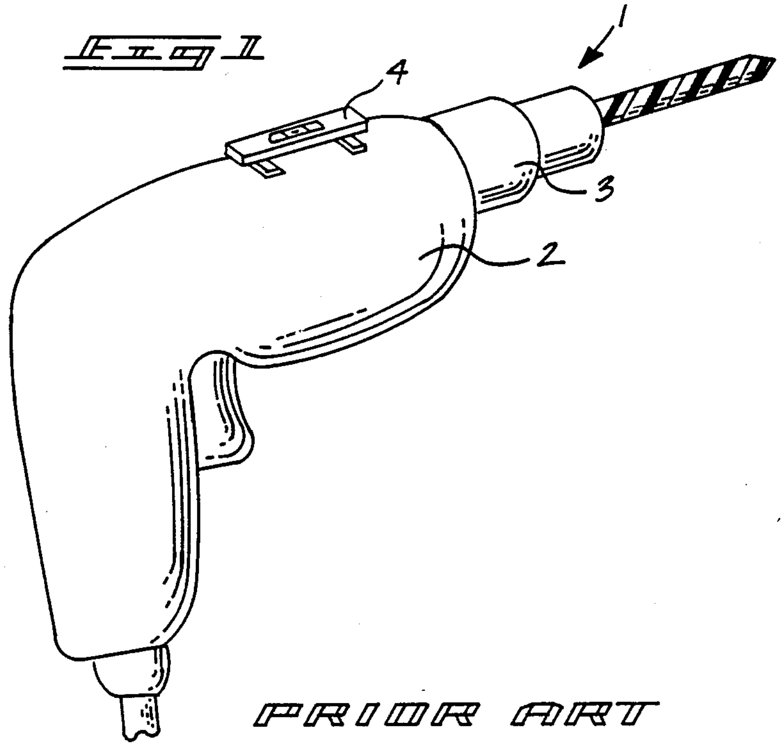
FIG. 1 is an isometric illustration of a prior art hand drill apparatus.
Figure 2:
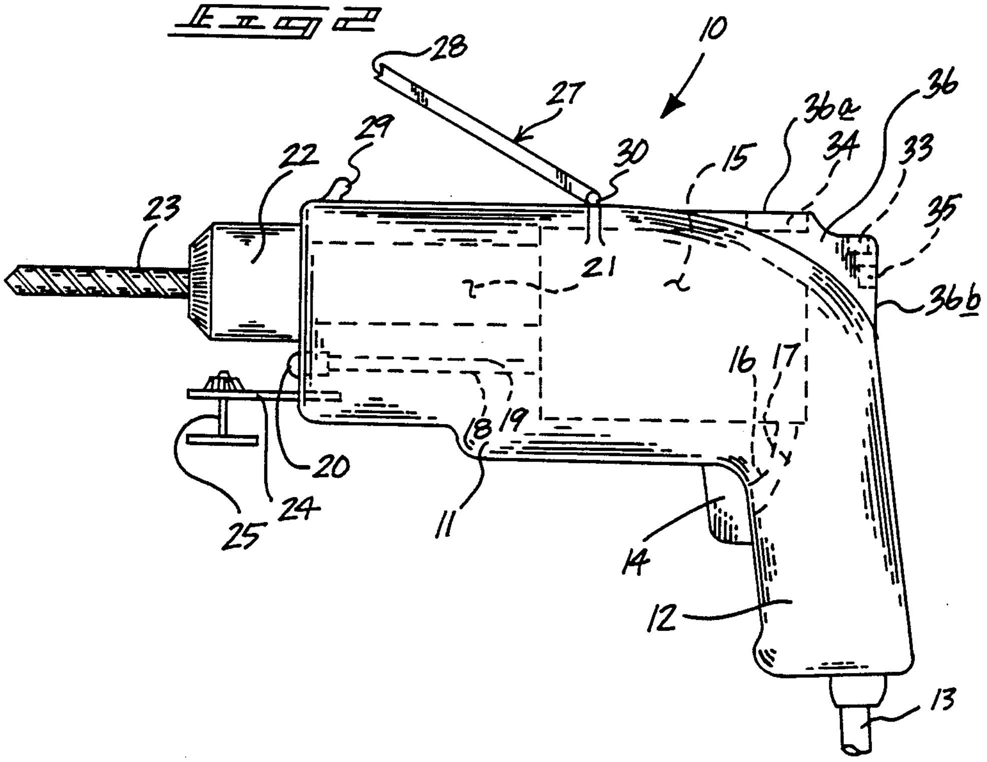
PRIOR ART FIG. 2
FIG. 2 is an orthographic side view taken in elevation of the instant invention.
Figure 3:
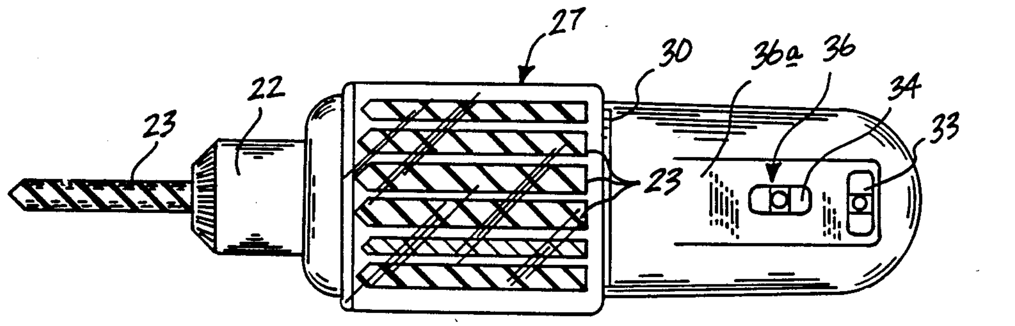
FIG. 3 is a top orthographic view of the instant invention.
Figure 4:
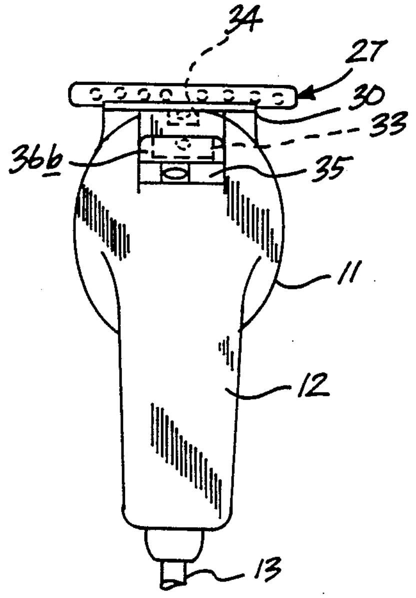
FIG. 4 is a rear orthographic view taken in elevation of the instant invention.
Figure 5:
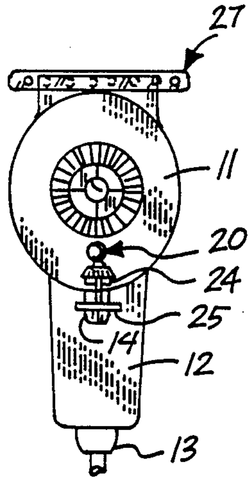
FIG. 5 is a frontal orthographic view taken in elevation of the the instant invention.

With reference now to the drawings, and in particular to FIGS. 1 to 8 thereof, a new and improved hand drill apparatus embodying the principles and concepts of the present invention and generally designated by the reference numeral 10 will be described.

FIG. 1 is illustrative of a typical prior art hand drill 1 defined by a housing 2 longitudinally aligned with an associated handle mounted orthogonally relative thereto. A chuck-key and housing 3 is positioned coaxially aligned with the housing 2 and formed with a spirit level member 4 mounted in overlying relationship relative to the housing of the drill longitudinally aligned therewith.

Figure 7:
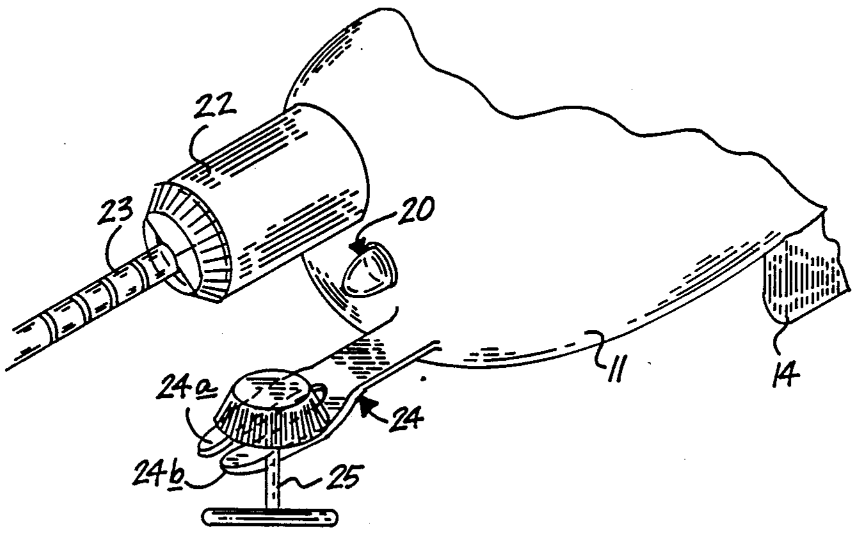
FIG. 7 is an isometric illustration of the chuck-key holder and illumination means in association with the drill housing of &he instant invention.
Figure 8:
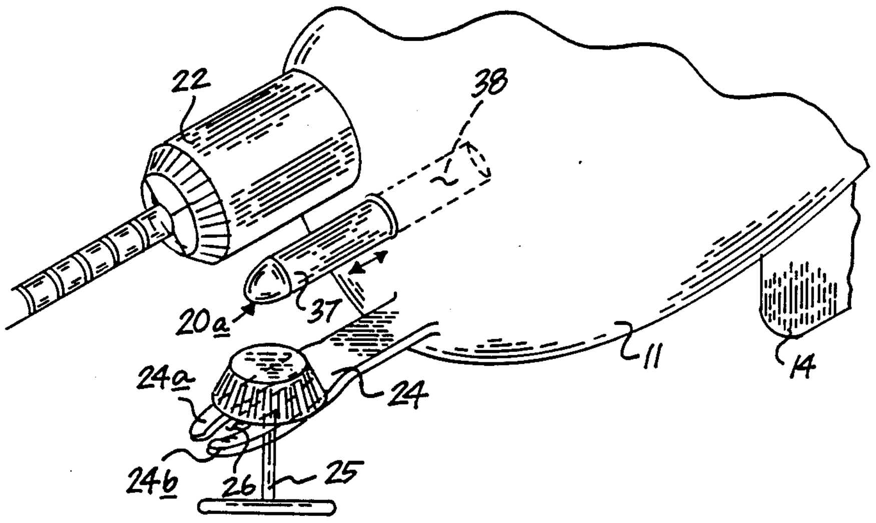
FIG. 8 is an isometric illustration of a modified illumination means utilized by the instant invention.

More specifically, the hand drill apparatus 10 essentially comprises a central longitudinally aligned housing 11 formed with a handle member 12 orthogonally mounted relative to the central housing 11, and including an electrical power transmission cord 13 directed therefrom to supply electrical power to the associated motor 15 that is selectively actuatable by a switch 14 mounted with the handle 12. A first and second respective electrical line 16 and 17 direct electrical energy from the switch 14 to the associated motor 15, with a third and fourth respective electrical line 18 and 19 in electrical association with the motor 15 and switch 14 to simultaneously provide electrical energy to an associated illumination light 20 mounted in an underlying relationship relative to an associated collet 22 that is rotatably driven by a drive shaft member 21 in association with the motor 15. A bifurcated collet key holder 24 is mounted and aligned in an underlying relationship relative to the collet 22 and drill bit 28 Reference to FIGS. 7 and 8 illustrate the bifurcated collet key holder 24 and formed with a respective first and second resilient leg member 24a and 24b defining a slot 26 therebetween to resiliently receive and engage a collet key 25 therewithin. The collet key holder 24 is defined by a length substantially equal to the length defined by the collet to prevent interference of the collet key holder 24 and associated collet key 25 when positioned within a slot 26 with operation of the drill bit 23 mounted within the collet 22.

Figure 6:
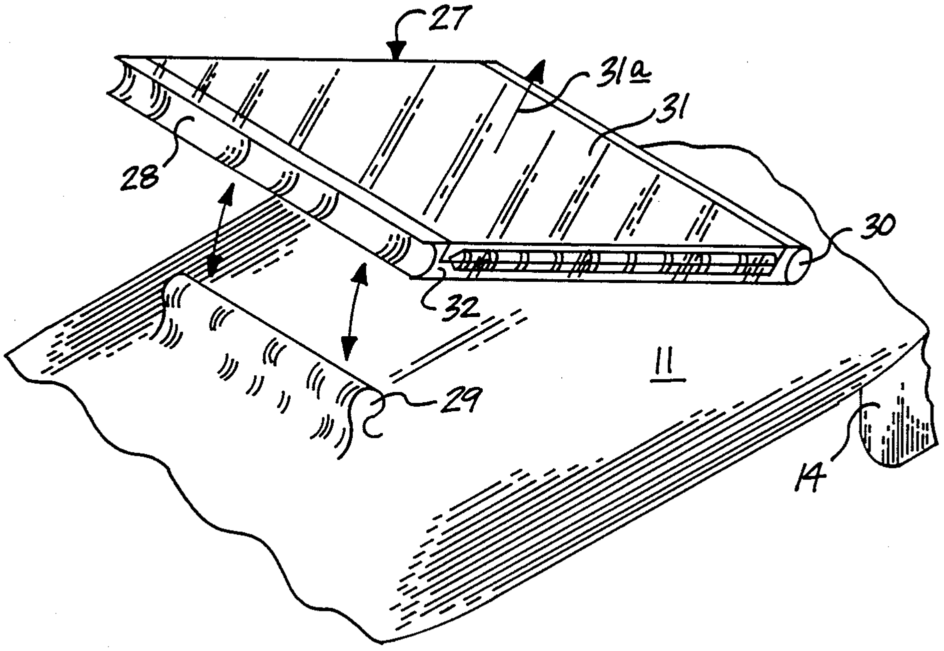
FIG. 6 is an isometric illustration of the drill bit housing in association with the hand drill housing of the instant invention.

Pivotally mounted in an overlying relationship relative to the central housing 11 is a transparent drill bit holder housing 27. The transparent housing 27 is formed with a "C" shaped, elongate concave groove 28 coextensive with a forward edge of the housing, wherein the groove 28 is aligned in a parallel relationship to a hinge 30 pivotally mounted the housing 27 to the top surface of the central housing 11. The "C" shaped concave groove 28 is cooperative with a "C" shaped elongate, convex flexible projection 29 to selectively secure the housing 27 adjacent the central housing 11 of the drill. A snap-fit cover 31 is removable in the direction of the arrow 31a, as illustrated in FIG. 6 for example, to obtain access interiorly of the housing. The pivotal mounting of the housing 27 enables enhanced access and use of the housing in drill selection. The cover 31, as illustrated in FIG. 6, is selectively securable to the base 32, wherein the base 32 mounts the hinge 30 and the concave groove 28 thereto.

A housing boss 36 is formed integrally to the housing 11 overlying the joinder of the housing 11 and the handle 12. The boss 36 is formed with a top planar surface 36a and a rear planar surface 36b. Within the top planar surface 36a is flush mounted a first mercury spirit level member 33 that is longitudinally aligned with the longitudinal orientation of the housing 11, with a second spirit mercury level member 34 positioned adjacent a rear end of the boss 36 and orthogonally aligned relative to the first mercury spirit level member 33. A mercury sphere is utilized within the level members 33, 34, as well as a third mercury spirit level member 35 to avoid dispersion of a conventional bubble as is utilized with conventional spirit levels due to the inherent vibration and the like associated in a drilling procedure. The third mercury spirit level member 35 is mounted within the rear planar surface 36b and oriented in a parallel relationship relative to the second mercury spirit level 33.

The orientation of the various spirit levels provides visual access in a convenient manner with the drill apparatus as utilized in a horizontal or vertical drilling orientation.

Reference to FIG. 8 illustrates a modified illumination light 20*a* mounted within a cylindrical telescoping housing 37 that is telescopingly receivable within a cylindrical cavity 38 to enable projection of the modified illumination member 20*a* relative to a forward portion of the collet 22 to provide enhanced illumination of a workpiece during a drilling procedure.

It is understood that the cooperation of the various components of the apparatus 10 providing securement of accessory drills 23 within the transparent housing 27, the securement of the collet key 25 in a collet key holder 24 forwardly of the housing 11, as well as the spirit levels utilized provide a cooperative combination of components rendering the organization convenient in use and of compact organization. Further, the flush mounting of the first, second, and third spirit levels 33, 34, and 35 respectively minimize obstruction of sight and potential engagement with an individual's hand during use of the apparatus 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand drill apparatus comprising an elongate, longitudinally aligned central housing having a handle portion mounted integrally thereto at a rear portion of the central housing, and a collet rotatably mounted at a forward surface of the central housing longitudinally aligned therewith, and a trigger switch mounted in the handle for selective operative energization of the collet, and the apparatus further comprising, an illumination member mounted to the forward surface of the central housing underlying the collet, and a collet key holder means defining a slot for securement of a collet key therewithin, and a housing means mounted overlying a top surface of the central housing defining a cavity therewithin for selective securement of a plurality of drill bits therewithin, and a housing boss formed rearwardly of the housing means, and at least one spirit level mounted completely within the housing boss, and wherein the housing boss is integrally formed to the central housing and the handle at an exterior intersection of the central housing and the handle, wherein the housing boss includes a top planar surface orthogonally aligned relative to a rear planar surface, and the at least one spirit level member mounted within the top planar surface longitudinally aligned with the central housing, and including a further spirit level member mounted rearwardly of the at least one spirit level member within the top surface of the housing boss, and further including a yet further spirit level member mounted within a rear surface of the housing boss aligned parallel to the further spirit level member, and the at least one spirit level member, the further spirit level member, and the yet further spirit level member each including a mercury sphere floatingly contained within each spirit level member to indicate orientation of the central housing and handle in use, and wherein the collet key holder means is of flexible construction and includes a bifurcated forward end defining the slot therewithin, wherein the bifurcated forward end is defined by a respective first and second flexible finger member to receive the collet key therewithin, and the collet key holder mounted to the forward surface of the central housing underlying the collet, and defining a predetermined length equal to a length defined by the collet.

2. An apparatus as set forth in claim 1 wherein the housing means is transparent and includes a rear hinge coextensively mounted to a rear end of the housing means to pivotally mount the housing means to the top surface of the central housing, and wherein the housing means further includes an elongate, concave groove oriented parallel to the hinge, the concave groove cooperative with a convex, flexible projection mounted to the top surface of the central housing to selectively secure the housing means to the flexible projection.

3. An apparatus as set forth in claim 2 wherein the housing means further includes a snap-fit cover thereon to provide selective access to the housing means, the snap-fit cover selectively securable to a base member, the base member mounting the hinge and the convex groove therewithin.

4. An apparatus as set forth in claim 3 wherein the illumination means is mounted underlying the collet, and the illumination means includes an elongate, cylindrical housing, the elongate, cylindrical housing telescopingly receivable within a cylindrical cavity formed within the central housing underlying the collet.

* * * * *